Aug. 22, 1939.   A. G. HOPKINS   2,170,639
SOLDERED METAL SEAM FOR SHEET METAL CANS AND METHOD OF MAKING SAME
Filed Oct. 20, 1936   2 Sheets-Sheet 1
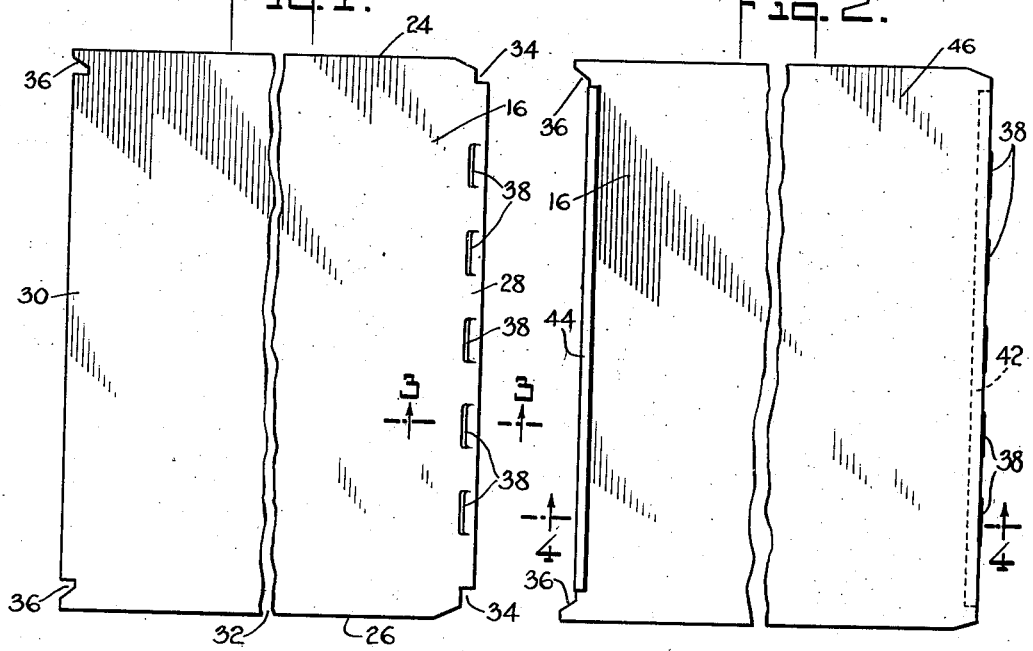
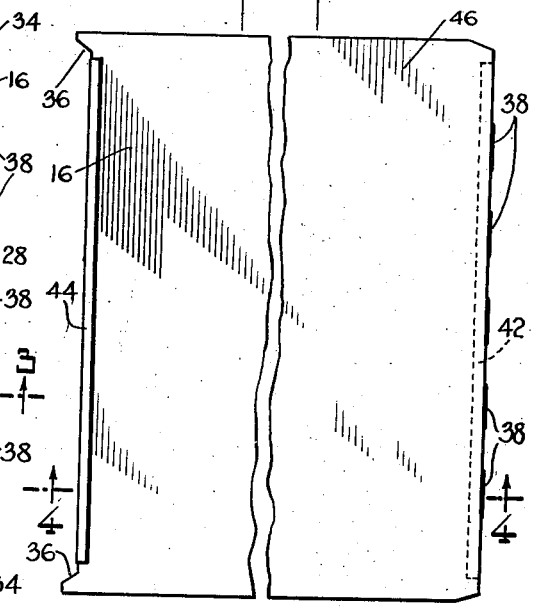
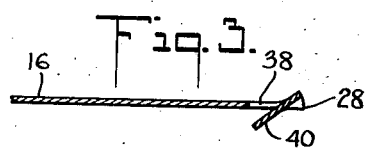
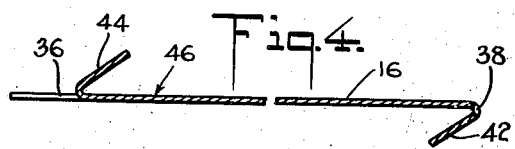
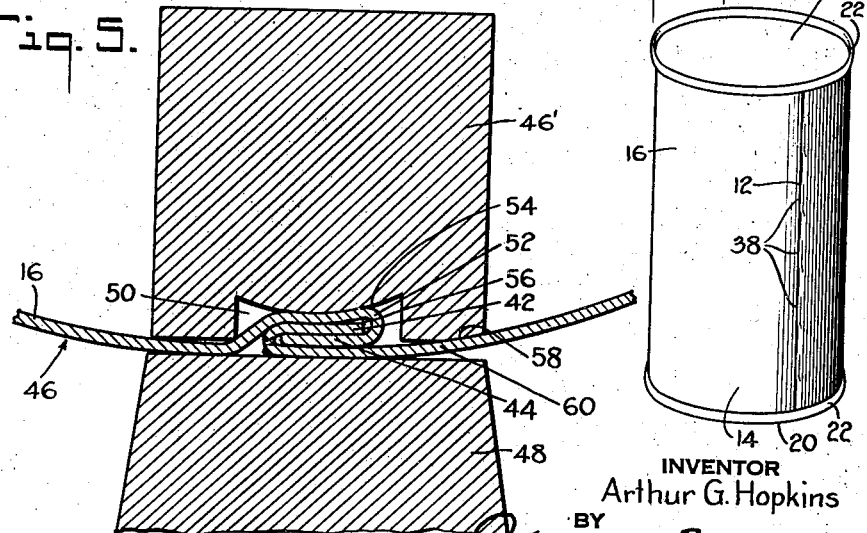
INVENTOR
Arthur G. Hopkins
BY
ATTORNEYS Aug. 22, 1939. A. G. HOPKINS 2,170,639
SOLDERED METAL SEAM FOR SHEET METAL CANS AND METHOD OF MAKING SAME
Filed Oct. 20, 1936 2 Sheets-Sheet 2
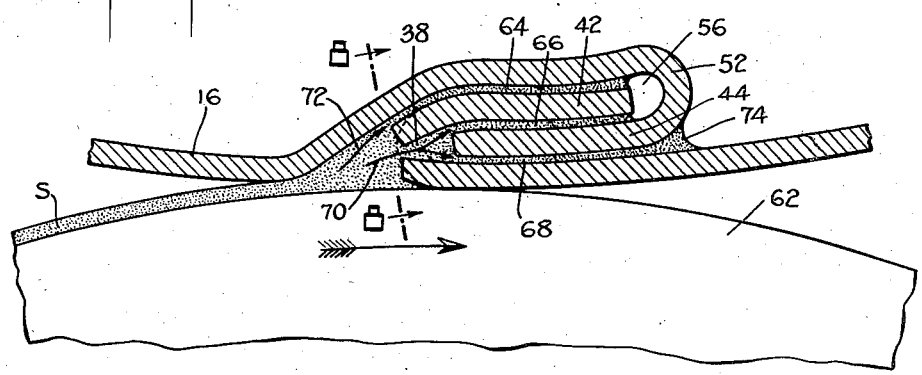
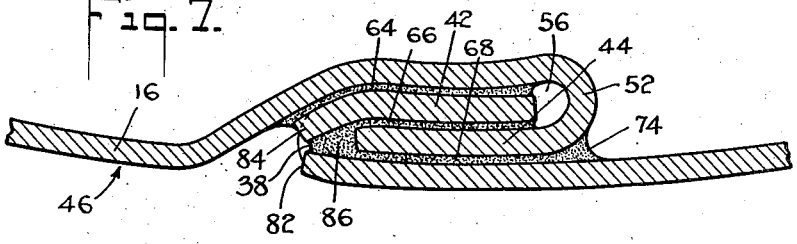
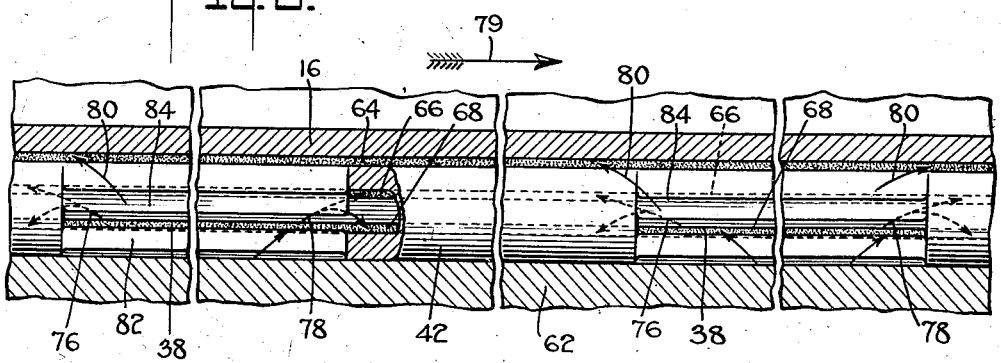
INVENTOR
Arthur G. Hopkins
BY
ATTORNEYS Patented Aug. 22, 1939

2,170,639

UNITED STATES PATENT OFFICE 2,170,639

SOLDERED METAL SEAM FOR SHEET METAL CANS AND METHOD OF MAKING SAME

Arthur G. Hopkins, Maspeth, N. Y., assignor to McKeesport Tin Plate Corporation, a corporation of Delaware Application October 20, 1936, Serial No. 106,513

5 Claims. (Cl. 113—112)

This invention relates to soldered seams for sheet metal, and relates more particularly to the making of an improved soldered metal seam for sheet metal cans or the like.

In my prior and copending application for Soldered can seam, Serial No. 70,064, filed March 21, 1936, there is described a soldered metal seam of the type having two reversely disposed hook edges interlocked to form four thicknesses of metal and three intervening solder spaces, wherein the seam is soldered by feeding the solder from the outside directly into each of the three solder spaces, thereby assuring the production of a triple seal of solder. This is accomplished by providing the outer hook of the seam at its bend with solder entrant openings, preferably obtained by a plurality of slits spaced longitudinally along said bend, the said openings providing passage for the solder flow into the two solder spaces within the outer hook in addition to the normal solder flow into the innermost solder space. The present invention is directed to improvements in the making of this solder seam.

I have found that an improved triple seal of solder may be obtained by modifying the structure of the seam at the bend of the inner hook thereof to produce a well defined air space at this region of the seam which is adapted to receive, permit the longitudinal movement of air and gas to a number of escape openings and to finally lodge or trap air and gas as the solder flows into the two solder spaces within the inner hook. In the construction described in my said copending application, there is a tendency for air to become lodged at the region of the bend of the inner hook as the solder flows into and fills the solder spaces within said inner hook. This lodgement of air impedes the solder flow and prevents proper distribution thereof. I have discovered that when an enlargement of the metal is provided at this bend so that a well defined air and gas space is produced thereat, a more efficient solder flow and solder seal is produced in the said two solder spaces within the inner hook of the seam. I have found, furthermore, that this modification of the structure at the inner hook bend may be obtained in the manufacture of the can body by a simple modification of the structure of the so-called spline which forms a part of the shaping horn of the can body making machine.

The prime objects of the present invention therefore comprise the making of an improved soldered metal seam of the nature referred to wherein the inner hook of the seam is provided at its bend with an enlargement defining an air space which receives, permits the longitudinal movement of air and gas to a number of escape openings and finally lodges and traps the residual gas and air as the solder flows into the solder spaces within the inner hook, the further provision of an improved seam wherein this enlargement at the inner hook bend is in the form of a longitudinally disposed air trough, and the still further provision of a seam of the character referred to wherein this air trough is obtained in the ordinary course of making the can body.

To the accomplishment of the foregoing and other objects which will hereinafter appear, my present invention consists in the soldered metal seam elements and their relation one to the other, as well as in the method for making the same, as hereinafter are more particularly described in the specification and sought to be defined in the claims. The specification is accompanied by drawings in which:

Fig. 1 shows a sheet metal blank preparatory to forming the side wall of the can;

Fig. 2 shows the blank after the edges thereof have been bent to hook form;

Fig. 3 is a section on an enlarged scale taken in the plane of the line 3—3 of Fig. 1;

Fig. 4 is a section on an enlarged scale taken in the plane of the line 4—4 of Fig. 2;

Fig. 5 is a view depicting the operation of compacting the seam and showing in cross-section a fragmentary part of the can body making machine;

Fig. 6 is a view depicting the operation of soldering the seam and showing on an enlarged scale the action of a part of the soldering apparatus;

Fig. 7 is a view of the completed soldered seam shown on an enlarged scale and taken in cross-section through a slitted part of the seam;

Fig. 8 is a view showing a longitudinal section of the seam and depicting the flow of solder during the soldering operation and taken in cross-section in the plane of the line 8—8 of Fig. 6; and Fig. 9 is a perspective view showing the completed can.

Referring to the drawings, and more particularly to Fig. 9, the invention is shown applied to a side seam 12 of a cylindrical can 14, but it will be understood that the seam may be used for cans of different configuration and for sheet metal joints in general. The can 14 is conventional in comprising a side wall 16 made of a single sheet of metal bent to cylindrical form, thus bringing the reversely disposed hook edges thereof together at the seam 12 where they are interlocked and soldered to form a leak-proof joint. The ends 18 and 20 are added to the side wall 16 and secured thereto by appropriate rolled seams 22. The ends and end seams may in the present case be assumed to be conventional and to form no part of the present invention, the invention being illustrated as applied to the side seam 12.

The blank 16 forming the side wall of the can is illustrated in Fig. 1. The edges 24 and 26 correspond to the top and bottom of the can, while the edges 28 and 30 are joined to form the side seam 12. It will be understood that the distance between the edges 28 and 30 is much greater than that indicated on the drawings, the intermediate area of the blank being broken away as is indicated at 32 in order that the important parts of the structure may be shown to an enlarged scale. The corners of the blank are notched at 34 and 36 in any desired or conventional manner, preferably to form a simple lapped seam at the top and bottom of the can, thereby facilitating subsequent seaming of the can ends to the side wall.

In accordance with the invention of my aforesaid prior application, the blank 16 is unique in being provided with a series of solder entrant openings 38. In preferred form, these openings are provided by slits which are aligned one with the other and which are disposed at the prospective bend or fold line at the hook edge of the blank; that is, the slits are spaced inwardly from edge 28 an amount equal to the width of the fold or hook with which the blank is subsequently provided. An incidental advantage of this is that the incisions facilitate accurate folding of the blank at the intended fold line. The slits are simply incisions, and preferably no area of metal is removed. The configuration of the metal at the slits will be clear by reference to Fig. 3, in which it will be seen that a part of the metal 40 at one side of a slit is displaced sidewardly slightly in order to accommodate the shearing movement of the metal at each side of the slit, and in order to properly open the slit in such a manner as to obtain a satisfactory solder entrant opening when the blank is finished.

The edge portions 28 and 30 of the blank are next folded to hook formation, thus bringing the blank to the condition shown in Figs. 2 and 4, the folds or hooks at the ends of the blank being numbered 42 and 44. Fold or hook 42 is preferably made inwardly of the blank, and fold or hook 44 outwardly; that is, the surface 46 in Fig. 4 is the outer surface of the blank. This surface may be appropriately lithographed to properly identify the product and its maker, while the inner surface may be lacquered or otherwise treated for protection of the contents of the can. The incised hook, that is, hook 42, is made inward and the other hook is made outward, in order to bring the solder entrant slits on the exterior of the can, for it is most convenient as well as conventional to feed solder to the seam from outside the can.

Fig. 5 depicts the operation of compacting the elements forming the seam after the hook edges 42 and 44 have been interlocked, the interlocking and compacting operations being accomplished when the can body is on the horn of the can body making machine. The seam is compacted by being compressed between a so-called spline 46 which forms part of the horn and which acts as an anvil and a hammer element 48 which is moved with an impact blow from a descended position to the ascended position shown in Fig. 5.

The spline 46' is suitably contoured on its anvil face to receive and give final shape to the seam, and such contour includes the provision of the groove 50 which extends centrally and longitudinally of the spline.

To carry out the aforesaid objects of the invention, the inner hook 44 of the seam is provided with an enlarged or bulbous formation in the region of its bend 52. This is accomplished in the body making step depicted in Fig. 5 by imparting a convex shape 54 (instead of using the standard flat shape) to the bottom of the spline groove 50. This convexity is required only at the region of the hook bend 52. By means of this modification of the structure of spline, the pressure on the metal is relieved at the hook bend 52 of the seam with the result that the can metal in this region is permitted to shape itself into the somewhat enlarged or bulbous formation shown. It results therefrom that a space or longitudinally extending trough 56 having an enlarged cross-sectional area is provided interiorly at the hook bend 52. This contour imparted to the bottom of the spline groove combined with the convexity imparted at 58 to one of the legs of the spline also has the effect of relieving excess pressure on the can metal in the region 60 thereof with the result that the can is produced with a cylindrically continuous and smooth exterior.

After the seam has been compacted, the can body is fed from the horn of the body maker to a long soldering roll over which the cylindrical can body is longitudinally moved and during which motion the soldering of the seam takes place. Fig. 6 of the drawings depicts the soldering step. The can body 16 is moved longitudinally, in the direction towards the reader, over a rotating soldering roll 62 which receives a surface layer of solder s from a solder bath (not shown) in which the soldering roll rotates. Can bodies 16 moving longitudinally in succession over the soldering roll, tangentially engage the roll in the region of the formed seam as shown in Fig. 6 with the result that the solder is flowed into the seam in the manner depicted in Fig. 6.

The two reversely disposed hook edges 42 and 44 of the seam form, throughout the seam length, four thicknesses of metal with three intervening solder spaces, the solder spaces being indicated as 64, 66 and 68. The provision of the intermittently disposed solder entrant openings 38, 38 at the bend of the outer hook 42 provide direct passage for solder flow into the two solder spaces within the outer hook 42, as indicated by the double headed arrow 70, in addition to the normal solder flow into the innermost solder space which is indicated by the arrow 72. Three short and direct paths of solder flow is thereby obtained and a triple solder seal assured.

By reason of the bulbous enlargement 52 at the bend of the inner hook 44 and the resultant provision of the air space or trough 56, the solder more readily flows into the two solder spaces 64 and 66 which are within the inner hook 44, the air and gas in these spaces, displaced by the incoming solder, moving readily into the enlarged trough 56, thence longitudinally and having exit or escaping at a number of available openings (at the unslitted sections during the early stages of the solder sweating-in operation), the residual air and gas finally being lodged by and trapped within the air space or trough 56. The solder also moves readily into the solder space 68 filling the same completely and forming a secure mechanical seal at the innermost region thereof by means of the fillet 74. Fig. 6 depicts the solder flow transversely into the seam at the slitted regions thereof, and Fig. 8 depicts the solder flow longitudinally into the remaining or unslitted parts of the seam. By reference to Fig. 8 it will be noted that at the unslitted parts of the seam, in addition to the transverse flow of solder into the solder space 64, the solder flows longitudinally in opposite directions from each solder entrant opening 38 into the solder spaces 66 and 68 at the unslitted portion of the hook 42 as indicated by the two sets of double headed arrows 76 and 78. The longitudinal movement of the seam over the soldering roll in the direction indicated by the arrow 79 also has an effect in inducing the longitudinal solder flow depicted by the double headed arrows 76, 78. The solder flow into the space 64 is indicated by the arrows 80.

The resulting seam structure after the soldering operation is shown in Fig. 7 of the drawings. Solder fills the solder spaces 64, 66 and 68 and the residual air (and gas) is lodged in and trapped by the trough 56. The seam is preferably so formed in the can body making step depicted in Fig. 5 that the lips 82 and 84 at the openings or slits 38 converge towards each other thereby facilitating the intake of solder, the space 86 between these lips being also thereby filled with solder in the resulting structure. In the soldering step the lip 82 also effectively serves as a solder-collecting lip, wiping the solder from the solder roll as the roll with its layer or film of solder is moved against this lip.

As is shown in such Figures as 1, 2, 8 and 9, the openings or slits 38 along the seam are preferably made substantial in length. I find that approximately half the seam length is preferably slitted or incised. With this proportioning of parts, the entire seam is saturated or filled with solder, including not only the slit, but also the unslitted parts of the seam. I have found that in a can of the size depicted in Fig. 9 of the drawings, the produced seam is of very substantial strength, the cans being able to withstand an internal pressure of one hundred and fifty pounds per square inch. Such cans may be very appropriately used for canning of liquids such as beer and ale which develop a substantial internal pressure.

It is believed that the improved metal seam of my invention, as well as the method of forming the same, and the many advantages thereof, will be apparent from the above detailed description. It will also be apparent that while I have shown and described the invention in a preferred form, many changes and modifications may be made in the structure disclosed without departing from the spirit of the invention defined in the following claims.

I claim:

1. A soldered metal seam for sheet metal cans or the like, said seam comprising two reversely disposed hook edges interlocked to form four thicknesses of metal with three solder spaces therebetween, the outer hook having at its bend a solder entrant opening which provides direct passage for solder flow into the two solder spaces within the outer hook in addition to the normal solder flow into the innermost solder space, the inner hook having at its bend an enlargement to provide an air space enlarged in cross-section to receive and permit the longitudinal movement of air and to finally trap the residual air as the solder flows into the two solder spaces within the said inner hook.

2. In the manufacture of a soldered metal seam having two reversely disposed hook edges interlocked to form a plurality of thicknesses of metal and a plurality of intervening solder spaces, the method which consists in relieving the metal in the region of the bend of the inner hook during the interlocking of the hook edges whereby an enlargement is provided at said bend and in thereafter feeding solder from the outside directly into the said solder spaces, the said enlargement providing an air space enlarged in cross-section at the bend of the inner hook to receive and permit the longitudinal movement of air and to finally trap the residual air as the solder flows into the solder spaces within said inner hook.

3. A metal seam for sheet metal cans or the like, said seam comprising two interlocked reversely disposed hook edges, one defining an outer hook and the other an inner hook, the outer hook being provided at its bend with a plurality of spaced slits extending along the bend, the inner hook being enlarged at its bend to provide a longitudinally disposed trough thereat enlarged in cross-section, the said seam having four thicknesses of metal with three intervening solder spaces in both its slitted and contiguous unslitted regions, the said trough functioning to receive and permit the longitudinal movement of air and to finally trap the residual air as the solder flows into the two solder spaces within the inner hook, and the said slits, defining solder entrant openings, communicating directly with the two solder spacees within the outer hook at the slitted region and thence into said two solder spaces in the unslitted regions and providing therefor direct and parallel passages for solder flow, whereby when solder is fed from the outside into said seam the solder is supplied to said three solder spaces by three short direct paths.

4. In the manufacture of a soldered metal seam for sheet metal cans or the like, the method which consists in forming two reversely disposed hook edges, one to define an outer hook and the other an inner hook, the outer hook being provided at its bend with a plurality of spaced slits extending along the bend, and interlocking said hook edges so that the inner hook is provided at its bend with an enlargement defining an air space, whereby the said seam has four thicknesses of metal with three intervening solder spaces in both its slitted and contiguous unslitted regions, and whereby the slits, defining solder entrant openings, communicate directly with the two solder spaces within the outer hook at the slitted region and thence into said two solder spaces in the unslitted regions, providing therefor direct and parallel passages for solder flow, and whereby the air space receives and permits the longitudinal movement of air as the solder flows into the two solder spaces within the inner hook; and then feeding solder from the outside directly into said seam, whereby solder is supplied to the three solder spaces by three short direct paths.

5. In the manufacture of a soldered metal seam for sheet metal cans or the like, the method which consists in forming two reversely disposed hook edges, one to define an outer hook and the other an inner hook, the outer hook being provided at its bend with openings spaced along the bend, and interlocking said hook edges so that the inner hook is provided at its bend with an enlargement defining an air trough, whereby the openings communicate directly with the two solder spaces within the outer hook providing therefor direct and parallel passages for solder flow, and whereby the air trough receives and permits the longitudinal movement of air as the solder flows into the two solder spaces within the inner hook; and then feeding solder from the outside directly into said seam, whereby solder is supplied to the three solder spaces by three short direct paths.

ARTHUR G. HOPKINS.